(12) United States Patent  (10) Patent No.: US 9,128,115 B2
Göthe  (45) Date of Patent: Sep. 8, 2015

(54) METHOD AND APPARATUS FOR EVALUATING DECELERATION OF A VEHICLE

(75) Inventor: Johan Göthe, Höganäs (SE)

(73) Assignee: DRIVEC AB, Helsingborg (SE)

( * ) Notice: Subject to any disclaimer, the term of this patent is extended or adjusted under 35 U.S.C. 154(b) by 193 days.

(21) Appl. No.: 13/578,197

(22) PCT Filed: Feb. 8, 2011

(86) PCT No.: PCT/EP2011/051799
§ 371 (c)(1),
(2), (4) Date: Jan. 2, 2013

(87) PCT Pub. No.: WO2011/098442
PCT Pub. Date: Aug. 18, 2011

(65) Prior Publication Data
US 2013/0103276 A1    Apr. 25, 2013

(30) Foreign Application Priority Data
Feb. 10, 2010  (SE) ........................................ 1050136

(51) Int. Cl.
*G06F 7/70* (2006.01)
*G06F 19/00* (2011.01)
(Continued)

(52) U.S. Cl.
CPC .............. *G01P 15/16* (2013.01); *B60R 16/0236* (2013.01)

(58) Field of Classification Search
CPC .......... B60W 20/00; B60W 2520/105; B60W 30/18018; B60W 2550/402; B60W 10/196; B60W 10/10; G08G 1/00; G08G 1/52; G08G 1/95; G06F 11/00; G06F 19/3443; G06F 19/707; G06F 17/30386; B60R 16/0236; B60R 2021/01259; B60R 2021/01306; B60R 2021/01327; G01P 15/16; G01P 15/135; G01P 15/00
USPC ......... 701/70, 1, 20, 96, 80, 301, 123, 18, 72, 701/73, 78; 473/222, 223; 280/5.514, 280/6.157, 728.1; 477/94, 107, 120, 139, 7
See application file for complete search history.

(56) References Cited

U.S. PATENT DOCUMENTS 6,246,946 B1 *  6/2001  Ohtsu .............................. 701/71
7,765,048 B2 *  7/2010  Suzuki et al. ................... 701/70
(Continued)

FOREIGN PATENT DOCUMENTS

| EP | 2028058 A2 | 2/2009 |
| WO | WO-2005/082674 A1 | 9/2005 |
| WO | WO-2009/125178 A2 | 10/2009 |

OTHER PUBLICATIONS

International Search Report PCT/ISA/210.

*Primary Examiner* — Calvin Cheung
*Assistant Examiner* — Luis A Martinez Borrero
(74) *Attorney, Agent, or Firm* — Harness, Dickey & Pierce, P.L.C.

(57) ABSTRACT

In accordance with the present inventive concept, there is provided a method for evaluating deceleration of a vehicle. The method comprises: measuring a deceleration of the vehicle during a first time interval, estimating a speed of the vehicle at a first time instant in a second time interval, which is different from the first time interval, based on the measured deceleration, measuring a speed of the vehicle at the first time instant, comparing the estimated speed to the measured speed, and generating a signal based on the comparison. There is also provided an apparatus for evaluating deceleration of a vehicle.

28 Claims, 7 Drawing Sheets

(51) Int. Cl.
*G06G 7/00* (2006.01)
*G06G 7/76* (2006.01)
*G01P 15/16* (2013.01)
*B60R 16/023* (2006.01)

(56) References Cited

U.S. PATENT DOCUMENTS

| | | | |
|---|---|---|---|
| 7,957,876 B2 * | 6/2011 | Shiiba et al. | 701/70 |
| 8,024,099 B2 * | 9/2011 | Suzuki et al. | 701/70 |
| 8,265,847 B2 * | 9/2012 | Miyajima et al. | 701/72 |
| 8,271,176 B2 * | 9/2012 | Kondou et al. | 701/72 |
| 8,306,718 B2 * | 11/2012 | Kubo et al. | 701/96 |
| 8,532,896 B2 * | 9/2013 | Braunberger et al. | 701/70 |
| 8,571,776 B2 * | 10/2013 | Braunberger et al. | 701/70 |
| 8,660,767 B2 * | 2/2014 | Nakai et al. | 701/70 |
| 2003/0182044 A1 * | 9/2003 | Nakamura et al. | 701/70 |
| 2004/0026992 A1 * | 2/2004 | Villaume | 303/126 |
| 2004/0111209 A1 * | 6/2004 | Kagawa et al. | 701/93 |
| 2005/0125134 A1 * | 6/2005 | Iwatsuki et al. | 701/70 |
| 2005/0125137 A1 * | 6/2005 | Shiiba et al. | 701/96 |
| 2005/0171676 A1 * | 8/2005 | Seki | 701/96 |
| 2005/0216162 A1 * | 9/2005 | Suzuki et al. | 701/70 |
| 2005/0234626 A1 * | 10/2005 | Shiiba et al. | 701/70 |
| 2006/0060399 A1 * | 3/2006 | Tabata et al. | 180/65.2 |
| 2006/0064225 A1 * | 3/2006 | Tabata et al. | 701/96 |
| 2006/0190158 A1 * | 8/2006 | Shiiba et al. | 701/70 |
| 2007/0106446 A1 * | 5/2007 | Phillips et al. | 701/71 |
| 2009/0125170 A1 * | 5/2009 | Noffsinger et al. | 701/20 |
| 2009/0157290 A1 | 6/2009 | Ji et al. | |
| 2009/0261963 A1 * | 10/2009 | Ault | 340/467 |
| 2009/0326774 A1 * | 12/2009 | Wang | 701/70 |
| 2009/0326820 A1 * | 12/2009 | Shimizu | 701/301 |
| 2010/0198474 A1 * | 8/2010 | Shiiba et al. | 701/70 |
| 2010/0217486 A1 * | 8/2010 | Taguchi | 701/41 |
| 2011/0066350 A1 * | 3/2011 | Sonoda et al. | 701/96 |
| 2011/0187522 A1 * | 8/2011 | Filev et al. | 340/441 |

* cited by examiner

METHOD AND APPARATUS FOR EVALUATING DECELERATION OF A VEHICLE

CROSS-REFERENCE TO RELATED APPLICATIONS

This application is a national phase under 35 U.S.C. §371 of PCT International Application No. PCT/EP2011/051799 which has an International filing date of Feb. 8, 2011, which claims priority to Swedish patent application number 1050136-9 filed Feb. 10, 2010.

TECHNICAL FIELD

The present inventive concept generally relates to vehicles. More specifically, the present inventive concept relates to methods and apparatus for evaluating deceleration of a vehicle.

BACKGROUND OF THE INVENTION

A general desire in the society today is to reduce the energy consumption of vehicles such as cars, trucks, lorries and buses. Reduced energy consumption may both increase the range of a vehicle as well as reduce emissions. This may apply both to petrol-driven vehicles, diesel-driven vehicles, electric motor vehicles and vehicles with fuel cells etc.

Today, most vehicles are provided with an energy consumption indicator, measuring the instant energy consumption (e.g. the consumption of petrol, diesel or electricity). The information given by the energy consumption indicator may be combined with information relating to average energy consumption per driven distance. Nevertheless, this information is not related to a desired level of energy consumption and the information does not provide any guidance for the driver to change his/her driving behavior or in what situations it should be changed.

For example, in terms of reduced energy consumption, it may be considered good driving behavior to avoid late and excessive braking. Moreover, it may be considered good driving behavior to use kinetic energy stored in the vehicle during accelerations to propel the vehicle and not remove this kinetic energy through unnecessary braking of the vehicle. This may have further positive effects in that the wear on the vehicle may be reduced.

Thus, there is a need in the prior art for efficient and reliable methods for evaluating deceleration of a vehicle.

SUMMARY OF THE INVENTION

In view of the above, an objective of the present inventive concept is to provide efficient and reliable methods and apparatus for evaluating deceleration of a vehicle.

According to a first aspect there is provided a method for evaluating deceleration of a vehicle. The method comprises:
  measuring a deceleration of the vehicle during a first time interval,
  estimating a speed of the vehicle at a first time instant in a second time interval, which is different from the first time interval, based on the measured deceleration,
  measuring a speed of the vehicle at the first time instant,
  comparing the estimated speed to the measured speed, and
  generating a signal based on the comparison.

By the inventive method, a difference between an estimated speed, based on a measured deceleration, and a measured speed may be determined. This difference corresponds to a driver induced loss of speed which the driver could have avoided by starting the deceleration earlier. The loss of speed thus reflects how foresighted, smooth and environmentally friendly the driving behavior, and especially the deceleration behavior, of the driver is.

By estimating a speed at a time instant during a second time interval based on a measured deceleration during a first time interval, no complicated predetermined models are needed. Any factors, internal of the vehicle or external to the vehicle, affecting the deceleration of the vehicle during the first time interval may hence be accounted for in the speed estimate. Factors which may affect the deceleration are i.a. the vehicle weight, the road type, the road condition, the slope of the road, the tire pressures, the vehicle geometry, prevailing weather conditions, the wind resistance etc.

By generating a signal based on the comparison, the driver may be informed if the deceleration is sub-optimal and thereby be guided to improve his behavior.

According to one embodiment, the method further comprises measuring the deceleration in response to detecting that the vehicle is coasting. In this context, coasting relates to a condition where the vehicle is driven with the engine disconnected, i.e. the transmission is in a neutral gear or the clutch is disengaged. During coasting, the deceleration of the vehicle is mainly due to the rolling friction and the wind resistance. The driver may not affect the deceleration appreciably during the first time interval. Hence, for a deceleration from a given initial speed the estimated speed is substantially independent of the behavior of the driver. Thus, the deceleration during the first time interval is in a sense ideal in that the driver uses the kinetic energy stored in the vehicle in an optimal way. The estimated speed may thereby be used as a reliable reference against which the actual speed of the vehicle at the instant may be compared.

According to one embodiment, the method further comprises finishing measuring the deceleration in response to detecting braking of the vehicle. If the driver engages the brakes of the vehicle this indicates that the deceleration during the first time interval was insufficient for reaching the final speed the driver intended.

In case the driver only brakes lightly, the difference between the estimated speed and the measured speed may be relatively small. However in case the driver applies the brakes strongly, the difference between the estimated speed and the measured speed may be relatively large.

The engaging of the brakes thus corresponds to a sub-optimal use of the kinetic energy stored in the vehicle which could have been avoided had the driver planned the deceleration more carefully.

As an alternative to the above described "coasting embodiment", there is provided an embodiment comprising measuring the deceleration in response to detecting that the vehicle is engine braking. According to this embodiment, engine braking is considered to be an "ideal deceleration". In some cases engine braking may be an energy efficient way of decelerating. Especially, during engine braking with a petrol-driven vehicle, the fuel injection may be closed wherein the fuel consumption of the vehicle is substantially reduced. Therefore, a deceleration by engine braking need not necessarily imply a bad driving behavior.

Moreover, in case the vehicle comprises an automatic transmission it may not be possible for the driver to disengage the clutch to put the vehicle in a coasting state. This is out of the control of the driver and is therefore, according to this embodiment, not considered to be bad driving behavior.

According to one embodiment the method further comprises finishing measuring the deceleration in response to detecting additional braking of the vehicle. In this embodiment, "additional braking" relates to any braking in addition to engine braking, e.g. application of friction brakes or activation of a retarder. In analogy with the previous discussion, this additional braking corresponds to a sub-optimal use of the kinetic energy stored in the vehicle which could have been avoided had the driver planned the deceleration more carefully.

According to one embodiment the method further comprises measuring the speed when the deceleration of the vehicle is finished. The difference between the estimated speed and the measured speed hence reflects the total driver induced loss of speed.

According to one embodiment, the slope of the road segment traveled by the vehicle during the first and the second time interval is constant.

According to one embodiment, the method further comprises determining a trend in the measured deceleration and estimating the speed at the first time instant by extrapolating the trend to the first time instant. Thereby, a reliable estimate of the speed may be determined which takes into account any factors, internal or external, affecting the deceleration of the vehicle.

According to one embodiment, the method further comprises generating the signal only if the trend deviates from the measured deceleration by less than a threshold value. This may be useful in case e.g. the slope of the road segment traveled by the vehicle during the first and second time interval varies. In that case, the deceleration measured during the first time interval may not correctly reflect an ideal deceleration. By discarding the signal in that case, this source of error may be eliminated.

According to one embodiment, the comparison comprises comparing the estimated speed squared to the measured speed squared. Since the kinetic energy of the vehicle is proportional to the speed of the vehicle squared this embodiment enables determination of the driver induced loss of kinetic energy.

According to a second aspect there is provided an apparatus for evaluating deceleration of a vehicle. The apparatus comprises:

a measurement unit arranged to measure a deceleration of the vehicle during a first time interval, and measure a speed of the vehicle at a first time instant in a second time interval, which is different from the first time interval, an estimation unit arranged to estimate a speed at the first time instant, based on the measured deceleration, a comparison unit arranged to compare the estimated speed to the measured speed, and a signal generator arranged to generate a signal based on the comparison.

The details and advantages discussed in relation to the first aspect apply correspondingly to the second aspect whereby reference is being made to the previous discussion.

According to a third aspect, there is provided a method for evaluating deceleration of a vehicle. The method comprises:

measuring a deceleration of the vehicle in a first time interval, measuring a speed of the vehicle at a first time instant in a second time interval, which is different from the first time interval, estimating a second time instant at which an estimated speed of the vehicle based on the measured deceleration matches the measured speed, comparing the first time instant and the second time instant, and generating a signal based on the comparison.

The concept and the advantages of the third aspect are similar to the concept and the advantages of the first and second aspect, however according to this aspect the comparison involves comparison of the first time instant, at which a certain speed is reached, and a second time instant, corresponding to an estimate of the time instant at which the vehicle would reach this certain speed had the deceleration in the first time interval been maintained. The difference between the first and the second time instant thus corresponds to an estimate of how much earlier the driver should have initiated the deceleration of the vehicle. The difference thus reflects how foresighted, smooth and environmentally friendly the driving behavior of the driver is.

By generating a signal based on the comparison, the driver may be informed if the deceleration is sub-optimal and thereby be guided to improve his behavior.

According to one embodiment the method further comprises determining a distance traveled by the vehicle during a time interval corresponding to the difference between the first and the second instant and preceding the first time interval and generating a signal based on the determined distance. In some cases, it may be easier for a driver to improve his driving behavior if he is informed of e.g. how long distance earlier he should initiate the deceleration.

Many of the details and advantages of the first aspect apply correspondingly to the third aspect, whereby reference is being made to the previous discussion.

According to a fourth aspect, there is provided an apparatus for evaluating deceleration of a vehicle. The apparatus comprises:

a measurement unit arranged to measure a deceleration of the vehicle in a first time interval, and measure a speed of the vehicle at a first time instant in a second time interval, which is different from the first time interval, an estimation unit arranged to estimate a second time instant at which an estimated speed of the vehicle based on the measured deceleration matches the measured speed, a comparison unit arranged to compare the first and the second time instant, a signal generator arranged to generate a signal based on the comparison.

The details and advantages discussed in relation to the third aspect apply correspondingly to the fourth aspect whereby reference is being made to the previous discussion.

According to a fifth aspect, there is provided a method for evaluating deceleration of a vehicle. The method comprises:

determining a time instant of initiation of a deceleration of the vehicle, measuring the deceleration of the vehicle during a first time interval, measuring a first speed of the vehicle at a first time instant in a second time interval, which is different from the first time interval, estimating a second time instant such that a deceleration, corresponding to the measured deceleration, from a second speed of the vehicle prior to the first time interval, during a time interval from the second to the first time instant, results in the first measured speed, comparing the second time instant and the time instant of initiation of the deceleration, and generating a signal based on the comparison.

The details and the advantages of the fifth aspect are similar to the details and the advantages of the third aspect, however this aspect may in some cases provide a more accurate estimate of how much earlier the driver should have initiated the deceleration of the vehicle.

According to one embodiment, the method further comprises measuring the speed of the vehicle during a third time interval prior to the time instant of initiation of the deceleration and determining the second speed of the vehicle as a speed of the vehicle measured during the third time interval. By this embodiment, it is possible to take any speed variations before the time instant of initiation of the deceleration into account and thereby provide a more accurate estimate of how much earlier the driver should have initiated the deceleration of the vehicle.

According to an alternative and more simple embodiment, the method further comprises measuring the speed of the vehicle at the time instant of initiation of the deceleration and determining the second speed of the vehicle as the speed of the vehicle at the time instant of initiation of the deceleration. This embodiment does not take any speed variations before the time instant of initiation of the deceleration into account. However, it may be simpler to implement since it does not require speed measurements before the time instant of initiation of the deceleration.

Many of the details and advantages of the first, second, third and fourth aspects apply correspondingly to the fifth aspect, whereby reference is being made to the previous discussion.

According to a sixth aspect, there is provided an apparatus for evaluating deceleration of a vehicle. The apparatus comprises:

a monitoring unit arranged to determine a time instant of initiation of a deceleration of the vehicle, a measurement unit arranged to measure the deceleration of the vehicle in a first time interval, and a first speed of the vehicle at a first time instant in a second time interval, which is different from the first time interval, an estimation unit arranged to estimate a second time instant such that a deceleration, corresponding to the measured deceleration, from a second speed of the vehicle prior to the first time interval, during a time interval from the second to the first time instant, results in the first measured speed, a comparison unit arranged to compare the second time instant and the time instant of initiation of the deceleration, and generating a signal based on the comparison.

The details and advantages of the fifth aspect apply correspondingly to the sixth aspect, whereby reference is being made to the previous discussion.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings, where like reference numerals will be used for like elements, wherein.

DETAILED DESCRIPTION OF PREFERRED EMBODIMENTS

Figure 1:
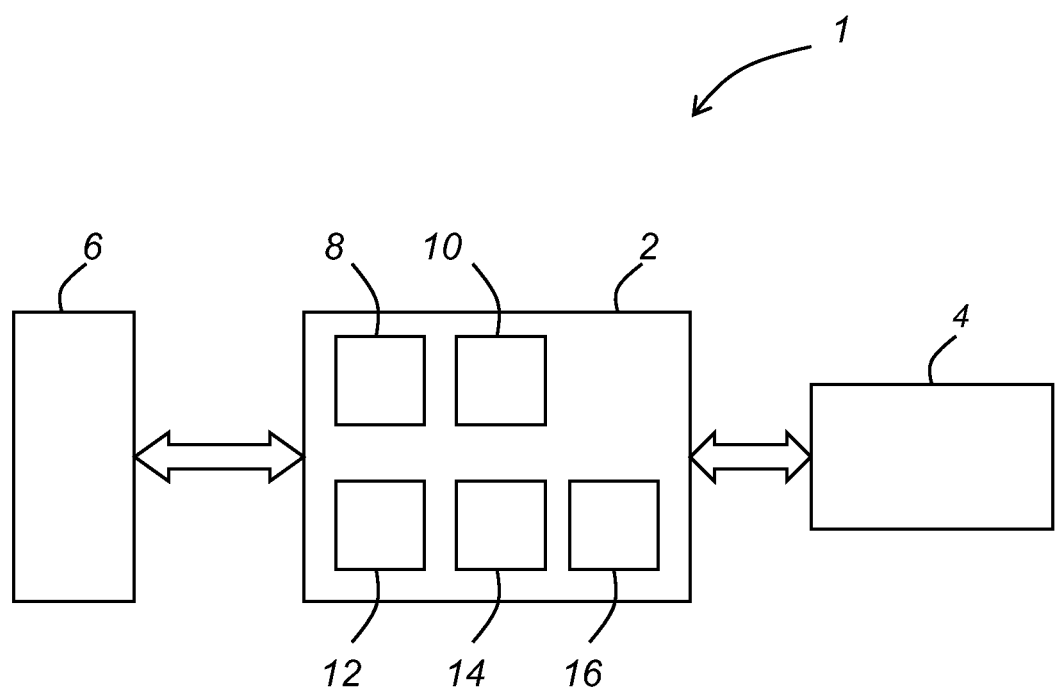
FIG. 1 schematically illustrates an apparatus in which the present inventive concept may be implemented.

FIG. 1 schematically illustrates an embodiment of an apparatus 1 in which the present inventive concept may be used. The apparatus 1 may be provided in a vehicle. In the following embodiments, the vehicle will be assumed to be a petrol-driven vehicle. However, the following embodiments may also be applied in vehicles using other sources of energy. The apparatus 1 may be a mobile computing device such as a mobile phone, a PDA or similar. However, the apparatus 1 may also be a personal computer or terminal which is arranged in the vehicle.

The apparatus 1 may comprise a display for presenting visual information to a driver of the vehicle. The apparatus may further comprise a speaker for presenting audible information to the driver. The apparatus may further comprise input means for receiving input from the driver.

The apparatus 1 comprises a processor 2, e.g. a micro processor, a CPU etc., a memory 4 and an I/O interface 6. The processor 2, the memory 4 and the I/O interface 6 are connected to each other, e.g. via a data bus, and arranged to communicate data between each other.

The I/O interface 6 is arranged to connect the apparatus 1 to a connection point of the vehicle to enable monitoring of various vehicle parameters. The connection point may e.g. be a CAN-bus wherein the apparatus 1 may receive signals and data relating to the speed of the vehicle, the number of revolutions of the engine, the active gear of the vehicle, the state of the clutch pedal, the state of the brakes of the vehicle etc.

The memory 4 may be a volatile memory, e.g. a Random Access Memory (RAM) or a flash memory etc. Preferably, the memory 4 includes a program section and a data section, wherein the program section may store software instructions and the data section may store data to be used in the method as will be described in detail below.

The processor 2 is arranged to execute software instructions stored in the program section of the memory 4 and implementing a method of the present inventive concept. More specifically, through the software instructions the processor 2 implements five functional blocks: a measurement unit 8, an estimation unit 10, a comparison unit 12, a signal generator 14 and a monitoring unit 16.

Alternatively, these functional blocks may be implemented in one or more integrated circuits. According to a further alternative, the functional blocks may be implemented in one or more application-specific integrated circuits (ASICs) or field-programmable gate arrays (FPGAs).

The measurement unit 8 is arranged to measure the speed of the vehicle. The measurement unit 8 may measure the speed based on speed data received via the I/O interface 6. Alternatively, the measurement unit 8 may determine the speed of the vehicle based on GPS data supplied by a GPS unit external to or included in the apparatus 1.

The monitoring unit 16 is arranged to monitor one or more parameters of the vehicle. The monitoring unit 16 may monitor the parameters based on parameter data received via the I/O interface 6. The parameters may e.g. be the state of the clutch, the throttle pedal, the brake system and/or the fuel injection pump. The processor 2 may control the further functional blocks based on states determined by the monitoring unit 16. For example, in response to the monitoring unit 16 detecting disengagement of the clutch, release of the throttle pedal and/or closing of the fuel injection pump the measurement unit 8 may start measuring the speed of the vehicle.

In the following, a method which may be implemented in the apparatus 1 will be described with reference to the diagram in FIG. 2 and the flow chart in FIG. 3. The diagram illustrates speed curves for the vehicle during a part of a run. In the following, it is assumed that the vehicle is running on a road segment having a zero or a constant inclination. Before the time instant $T_d$ the driver of the vehicle drives at a more or less constant speed.

At $T_d$ the driver starts to decelerate the vehicle by performing a deceleration action. The deceleration continues during the time interval $I_1$ illustrated in FIG. 2. The deceleration action may be releasing the gas pedal wherein mainly the rolling friction, any possible wind resistance and the engine resistance (i.e. the braking of the engine) will act to decelerate the vehicle. Alternatively, the deceleration action may be disengaging the clutch wherein the vehicle starts coasting. In this case, mainly the rolling friction and any possible wind resistance will act to decelerate the vehicle.

In case the vehicle uses a manual transmission the coasting may be achieved by the driver pressing down the clutch pedal or by shifting to the neutral gear. In case the vehicle uses an automatic transmission the coasting state may be achieved by the automatic transmission automatically disengaging the clutch or shifting to the neutral gear.

The reason for decelerating the vehicle may e.g. be to adapt the speed in relation traffic in front of the vehicle, to reduce the speed below a speed limit or to bring the vehicle to a complete stop etc.

The monitoring unit 16 detects the deceleration action (box 31) and in response determines and stores the time $T_d$ of the detection in the memory 4. Moreover, the measurement unit 8 starts to measure the deceleration of the vehicle (box 32). The measurement unit 8 may measure a speed of the vehicle on at least two time instants $v_{act}(T_1)$ and $v_{act}(T_2)$ during $I_1$. By way of example, $T_1$ may correspond to $T_d$ and $T_2$ may correspond to $T_b$. However, any two separate instants during $I_1$ may be used. The measurement unit 8 stores the measured speed along with the times $T_1$ and $T_2$ in the memory 4.

Optionally, the measurement unit 8 may measure and store the deceleration of the vehicle for more than two time instants, e.g. $v_{act}(T_1), v_{act}(T_2), \ldots v_{act}(T_N)$, during $I_1$.

Figure 2:
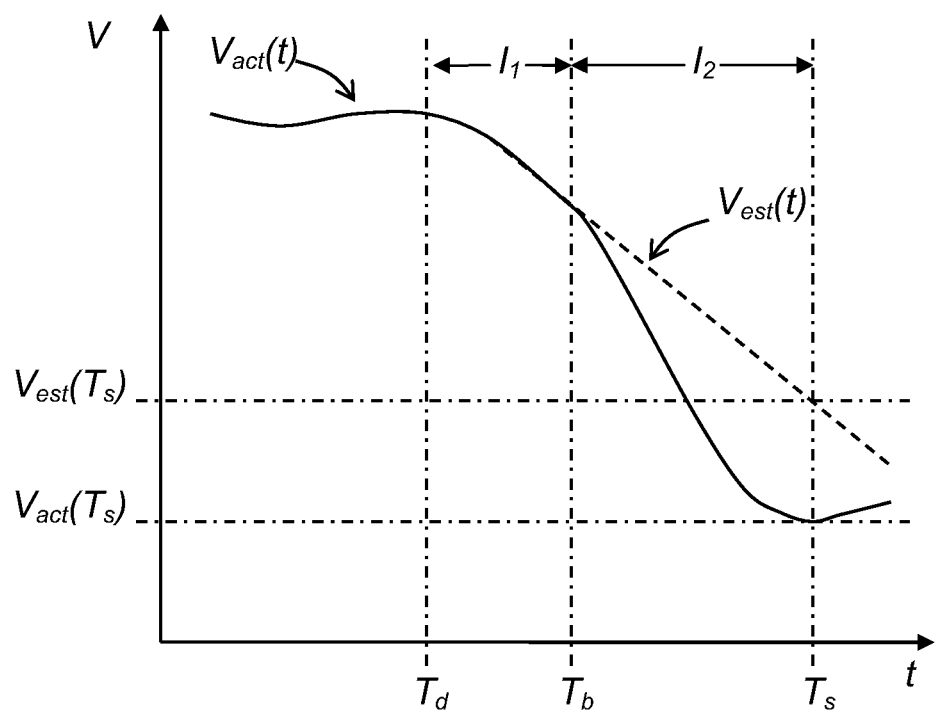
FIG. 2 is a diagram of the speed of the vehicle during a part of a run.
Figure 3:
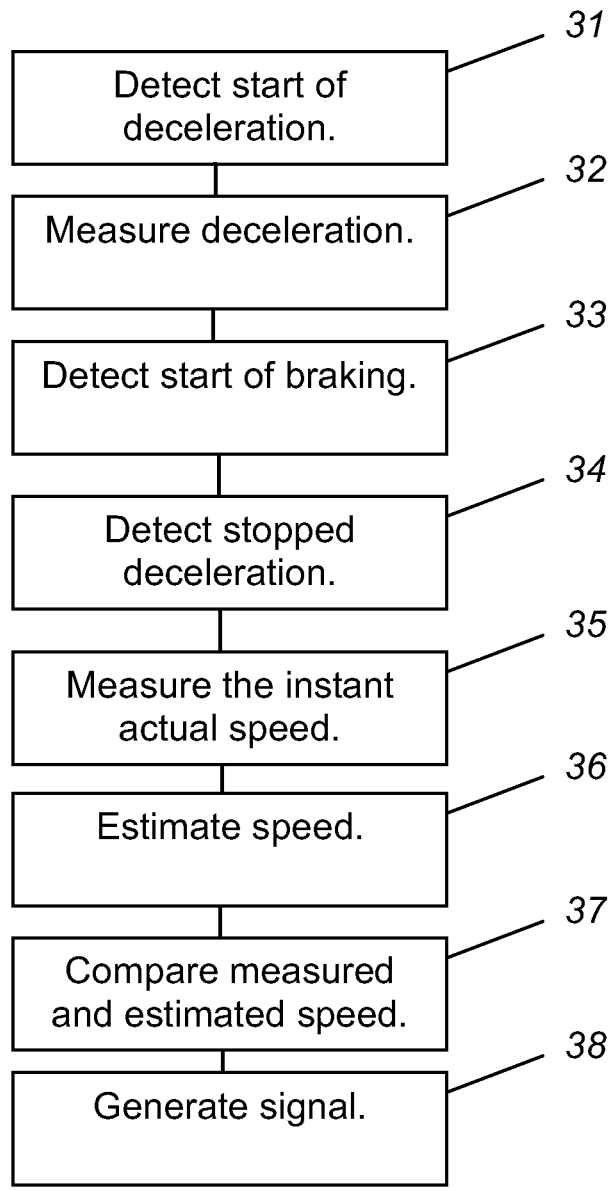
FIG. 3 is a flow chart for an embodiment of a first method.

At the time instant $T_b$, the driver begins to decelerate the vehicle more strongly and continues to do so during the entire time interval $I_2$ indicated in FIG. 2. The driver may achieve this by e.g. activating friction brakes such as disc brakes, activating a retarder (if available), activating an engine brake etc. The reason for decelerating more strongly may e.g. be that the driver realizes that the deceleration achieved through coasting is insufficient for reaching the intended final speed at the intended time.

The monitoring unit 16 detects the initiation of the braking at $T_b$ wherein the measurement unit 8 finishes measuring the deceleration (box 33).

At $T_s$ the driver stops decelerating the vehicle (i.e. the driver stops braking the vehicle or the vehicle comes to a full stop). The monitoring unit 16 detects the stopped deceleration (box 34) and determines and stores the time $T_s$ of the detection in the memory 4. In response, the measurement unit 8 measures the instant actual speed of the vehicle at $T_s$, $v_{act}(T_s)$, and stores the measured speed in the memory 4 (box 35).

The estimation unit 10 retrieves the measured speeds and the corresponding times stored in the memory 4 by the measurement unit 8 and the monitoring unit 16. The estimation unit 10 uses the retrieved data to estimate a speed of the vehicle at $T_s$ based on the deceleration measured by the measurement unit 8 during $I_1$ (box 36). In case the speed at two time instants was measured, the estimation unit 10 may estimate the speed $v_{est}$ at $T_s$ using the following formula:

$$v_{est}(T_s) = v_{act}(T_2) + \frac{v_{act}(T_2) - v_{act}(T_1)}{T_2 - T_1} \cdot (T_s - T_2)$$

or some equivalent expression. $v_{est}(T_s)$ thus forms an estimate of the speed the vehicle would reach if the degree of deceleration during $I_1$ is maintained until $T_s$. Or put differently, $v_{est}(T_s)$ is an estimate of the speed at $T_s$ had the driver continued coasting during $I_2$ and thereby used the kinetic energy stored in the vehicle to propel the vehicle until $T_s$. $v_{est}(T_s)$ calculated from the formula of above may form a good estimate assuming that the deceleration is mainly linear with respect to time. For example, this may be the case when coasting at modest speeds where the wind resistance is negligible and the rolling friction is substantially independent of speed.

In case the speed was measured at more than two time instants during $I_1$ (e.g. $v_{act}(T_1), v_{act}(T_2), \ldots v_{act}(T_N)$) the estimation unit 10 may determine a deceleration trend $v_{est}(t)$ in the received data and determine $v_{est}(T_s)$ by extrapolating the trend $v_{est}(t)$ to $T_s$.

The trend may be determined using techniques such as curve fitting or regression analysis. The specific type of technique may be chosen depending on the accuracy needed and the processing resources available. For example, a second order polynomial (or higher) may be used to take the rolling friction, the wind resistance and the engine resistance into account. In some cases the method of least squares may provide an even more accurate estimate.

Optionally, the estimation unit 10 may determine the accuracy of the trend in relation to the measured deceleration. For example, in case the method of least squares is used, a large $R^2$ value may indicate that it not was possible to determine an accurate trend based on the measured deceleration. If the $R^2$ value exceeds a threshold value the method may be aborted. Alternatively, this determination may be made based on the standard deviation in the measured deceleration. If the standard deviation exceeds a threshold value the method may be aborted. According to a further alternative, the determination may be made based on the deviation between the trend and the measured deceleration. E.g. in case one (or more) of the measured speeds during $I_1$ differs from the trend by more than a threshold value the method may be aborted.

One situation when the trend may not be accurate for estimating the speed $v_{est}(T_s)$ is if the inclination of the road segment traveled by the vehicle during $I_1$ not is constant.

Returning to FIG. 3, the estimation unit 10 stores the speed estimate $v_{est}(T_s)$ in the memory 4. The comparison unit 12 retrieves both $v_{est}(T_s)$ and $v_{act}(T_s)$ from the memory 4 and compares them (box 37).

The difference between $v_{est}(T_s)$ and $v_{act}(T_s)$ corresponds to the amount of speed that has been lost due to the stronger deceleration (i.e. the braking) during $I_2$. In other words, the difference corresponds to the driver induced loss of speed. A more energy efficient driving behavior would have been to start the deceleration earlier and thereby more efficiently use the kinetic energy stored in the vehicle.

Optionally, the comparison unit 12 may compare the estimated speed $v_{est}(T_s)$ squared with the measured speed $v_{act}(T_s)$ squared. The difference between $v_{est}(T_s)$ squared and $v_{act}(T_s)$ squared is proportional to the amount of kinetic energy that has been lost due to the stronger deceleration during $I_2$.

The comparison unit 12 stores the result of the comparison in the data memory 4. The result may e.g. simply be a "true" value (e.g. a "1") indicating that the measured speed was larger than the estimated speed. Alternatively, the result may be the actual difference between $v_{est}(T_s)$ and $v_{act}(T_s)$ (or the difference between $v_{est}(T_s)$ squared and $v_{act}(T_s)$ squared). The signal generator 14 retrieves the result from the memory 4 and generates a signal based on the result (box 38).

The signal may be a control signal for a display of the apparatus 1 or in the driver's cabin, wherein the display may present information regarding the amount of speed or kinetic energy lost due to excessive braking. The signal may also be a control signal for a loudspeaker, wherein the loudspeaker may generate a sound signal with an intensity and/or frequency which is proportional to the difference.

Optionally, the apparatus 1 may comprise a table including averaged deceleration trends for different gears. In case linear deceleration trends are determined, the table may comprise averaged gradients. Each time a trend is determined the relevant entry in the table may be updated. The table may also include an entry corresponding to an averaged deceleration trend for the neutral gear. Additionally, or alternatively, the table may include the ratio of the gradient for a specific gear and the gradient for a subsequent gear (e.g. gradient of the fifth gear divided by the gradient of the fourth gear, the gradient of the fourth gear divided by the gradient of the third gear etc.)

This table may be advantageously used in case the driver shifts gear during the deceleration in $I_1$. The apparatus 1 determines a deceleration trend during $I_1$ for each gear. The apparatus 1 may then use the deceleration trend determined for the final gear used when the mechanical brakes are applied at $T_b$ as described above. However, in case determination of a trend for the final gear fails (e.g. due to bad or too few measured values) the table may provide a fallback option. For example, the estimate $v_{est}(T_s)$ may be calculated based on the determined deceleration for the previous gear and the corresponding above-mentioned ratio. For example, the driver starts decelerating at $T_d$ by engine braking in the fourth gear. At some point during $I_1$ the driver shifts to the third gear and shortly thereafter applies a mechanical brake of the vehicle. In case the apparatus 1 fails to determine the deceleration trend for the third gear, an estimate may be determined based on the determined gradient for the fourth gear, multiplied by the stored ratio between the fourth and the third gear.

In the above, the apparatus 1 has been described to perform certain actions in a specific order, at certain times and in response to certain events. However, the inventive concept is not limited to this specific implementations but other implementations are also considered to be within the scope of the appended claims.

For example, the measurement unit 8 may measure and store the speed of the vehicle continually during at least a part of a run in the memory 4. The stored speed data may then be processed and analyzed after the run has been completed.

In the above, all the functionality of the apparatus 1 is provided in the vehicle. According to an alternative embodiment, all the functionality of the apparatus 1 need not be provided in the vehicle. For example, the functions provided by the estimation unit 10, the comparison unit 12 and or the signal generator 14 may be arranged in a external unit separate from the apparatus 1. For example, measurement data collected by the measurement unit 8 may be provided to the external unit by physically connecting the measurement unit 8 thereto after a run has been completed. Alternatively, the apparatus 1 may comprise a wireless transmitter/receiver for wirelessly communicating measurement data collected by the measurement unit 8 to the external unit, e.g. a server, wherein the behavior evaluation may be performed at a central location.

Figure 4:
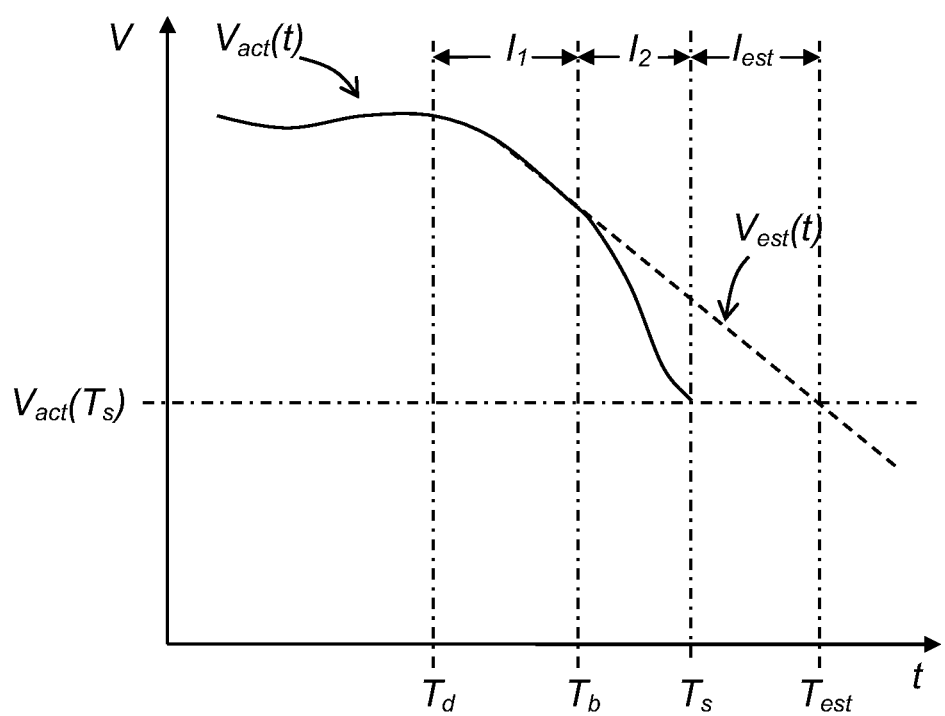
FIG. 4 is a diagram of the speed of the vehicle during a part of a run.
Figure 5:
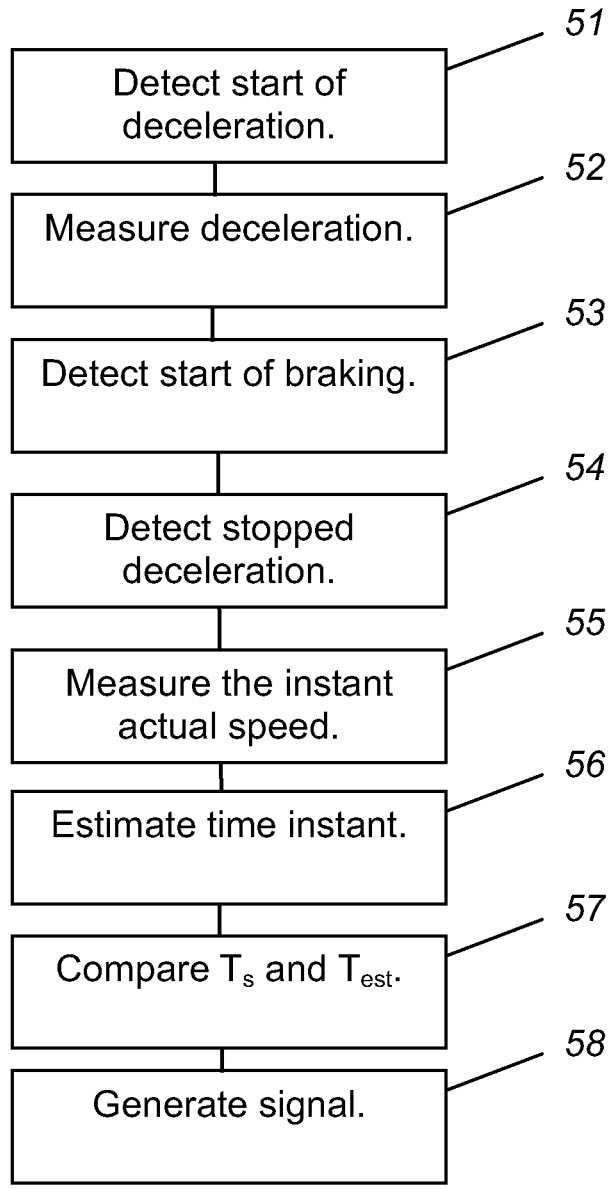
FIG. 5 is a flow chart for an embodiment of a second method.

In the following, a method of an embodiment in accordance with a further aspect which also may be implemented in the apparatus 1 will be described with reference to the diagram in FIG. 4 and the flow chart in FIG. 5. Similar to FIG. 2, the diagram in FIG. 4 illustrates speed curves for the vehicle during a part of a run. Up until time instant $T_b$, the method proceeds as the method described in relation to FIGS. 2 and 3. I.e. the start of a deceleration is detected wherein the measurement unit 8 starts measuring a deceleration during $I_1$ and stores measured data in the memory 4 (box 51 and 52).

At $T_b$ the driver starts braking. The monitoring unit 16 detects the initiation of the braking wherein the measurement unit 8 finishes measuring the deceleration (box 53).

At time instant $T_s$ the driver stops decelerating the vehicle (i.e. the driver stops braking the vehicle or the vehicle comes to a full stop). The monitoring unit 16 detects the stopped deceleration (box 54) and determines and stores the time $T_s$ of the detection in the memory 4. In response the measurement unit 8 measures the instant actual speed of the vehicle at $T_s$, $v_{act}(T_s)$, and stores the measured speed in the memory 4 (box 55).

The estimation unit 10 retrieves the measured speeds and the corresponding times stored in the memory 4 by the measurement unit 8 and the monitoring unit 16. The estimation unit 10 uses the retrieved data to estimate a time instant $T_{est}$ at which an estimated speed of the vehicle $v_{est}(T_{est})$, based on the deceleration measured by the measurement unit 8 during $I_1$, matches the actual measured speed $v_{act}(T_s)$ (box 56). In case the speed was measured at two time instants, the estimation unit 10 may estimate the time instant $T_{est}$ using the following formula:

$$v_{act}(T_s) = v_{act}(T_2) + \frac{v_{act}(T_2) - v_{act}(T_1)}{T_2 - T_1} \cdot (T_{est} - T_2)$$

or some equivalent expression. $T_{est}$ thus forms an estimate of the time at which the vehicle would reach the speed $v_{act}(T_s)$ if the degree of deceleration during $I_1$ had been maintained until $T_s$. Or put differently, $T_{est}$ is an estimate of the time instant at which the vehicle would reach the speed $v_{act}(T_s)$ had the driver continued the deceleration of $I_1$ during $I_2$ and thereby better used the kinetic energy stored in the vehicle to propel the vehicle until $T_s$. $v_{est}(T_s)$ calculated according to the formula of above may form a good estimate assuming that the deceleration is mainly linear with respect to time. For example, this may be the case when coasting at modest speeds where the wind resistance is negligible and the rolling friction is substantially independent of speed.

In case the speed was measured at more than two time instants (e.g. $v_{act}(T_1)$, $v_{act}(T_2)$, ... $v_{act}(T_N)$) the estimation unit 10 may determine a deceleration trend in the received data and determine the time instant $T_{est}$ at which an extrapolation of the trend matches $v_{act}(T_s)$.

As discussed earlier, the trend may be determined using techniques such as curve fitting or regression analysis. The specific type of technique may be chosen depending on the accuracy needed and the processing resources available.

Optionally, as discussed in relation to the previous method, the estimation unit 10 may determine the accuracy of the trend in relation to the measured deceleration and abort the method in case the accuracy is insufficient.

The estimation unit 10 stores the time estimate $T_{est}$ in the memory 4. The comparison unit 12 retrieves both $T_{est}$ and $T_s$ from the memory 4 and compares them (box 57).

The difference between $T_{est}$ and $T_s$ ($I_{est}$ in FIG. 4) may be interpreted as how much earlier the driver should have initiated the deceleration in order to reach the intended speed $v_{est}(T_s)$ at $T_s$ without applying the brakes during $I_2$.

The comparison unit 12 stores the result of the comparison in the data memory 4. The result may e.g. simply be a "true" value (e.g. a "1") indicating that the $T_{est}$ was larger than $T_s$. Alternatively, the result may be the actual difference between $T_{est}$ and $T_s$, i.e. $I_{est}$. The signal generator 14 retrieves the result from the memory 4 and generates a signal based on the result (box 58).

As discussed in relation to the other method, the signal may be any one of a control signal for a display and/or for a loudspeaker corresponding to the result of the comparison.

Optionally, the apparatus 1 may comprise a distance unit arranged to estimate a distance traveled by the vehicle during a time interval corresponding to the time difference between $T_{est}$ and $T_s$. This distance estimate may be an estimate of at what position, before the position at $T_d$, the driver should have initiated the deceleration in order to reach the intended speed $v_{est}(T_s)$ at $T_s$ without braking during $I_2$. The distance estimate may be calculated by multiplying the time difference $I_{est}$ by the actual speed of the vehicle at $T_d$, i.e. $v_{act}(T_d)$.

According to a more elaborate version, the measurement unit 8 may be arranged to measure and store the speed of the vehicle also before $T_d$. The distance estimate may then be calculated by integrating the vehicle speed from a time instant preceding $T_d$ by a time corresponding to $I_{est}$.

In any case, the signal generator 14 may generate a control signal based on the distance estimate.

Figure 6:
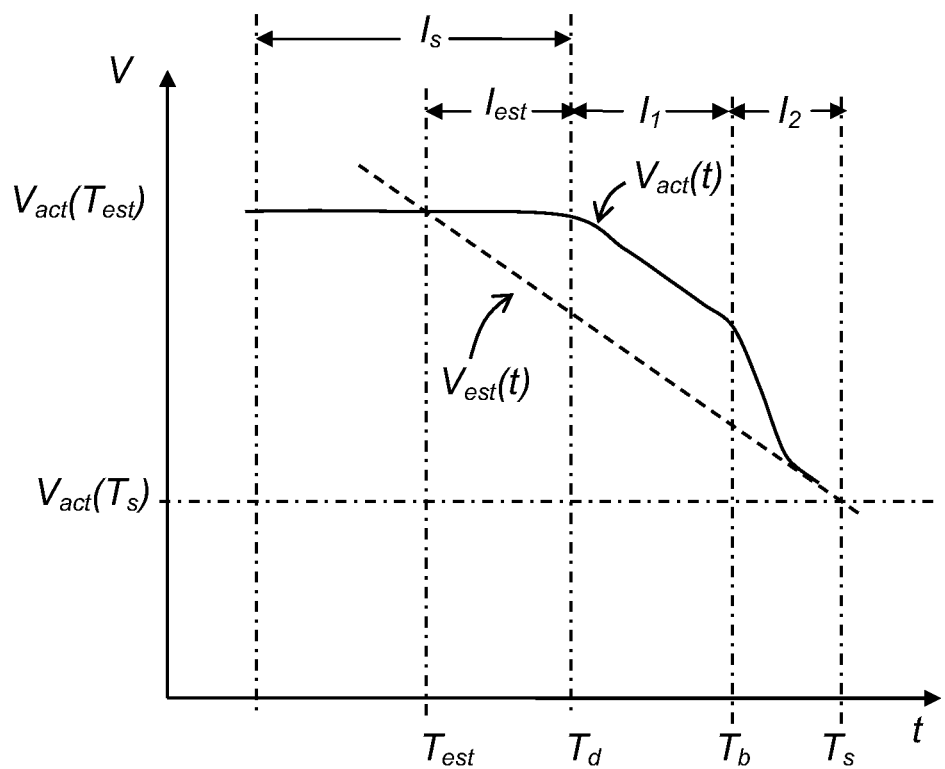
FIG. 6 is a diagram of the speed of the vehicle during a part of a run.
Figure 7:
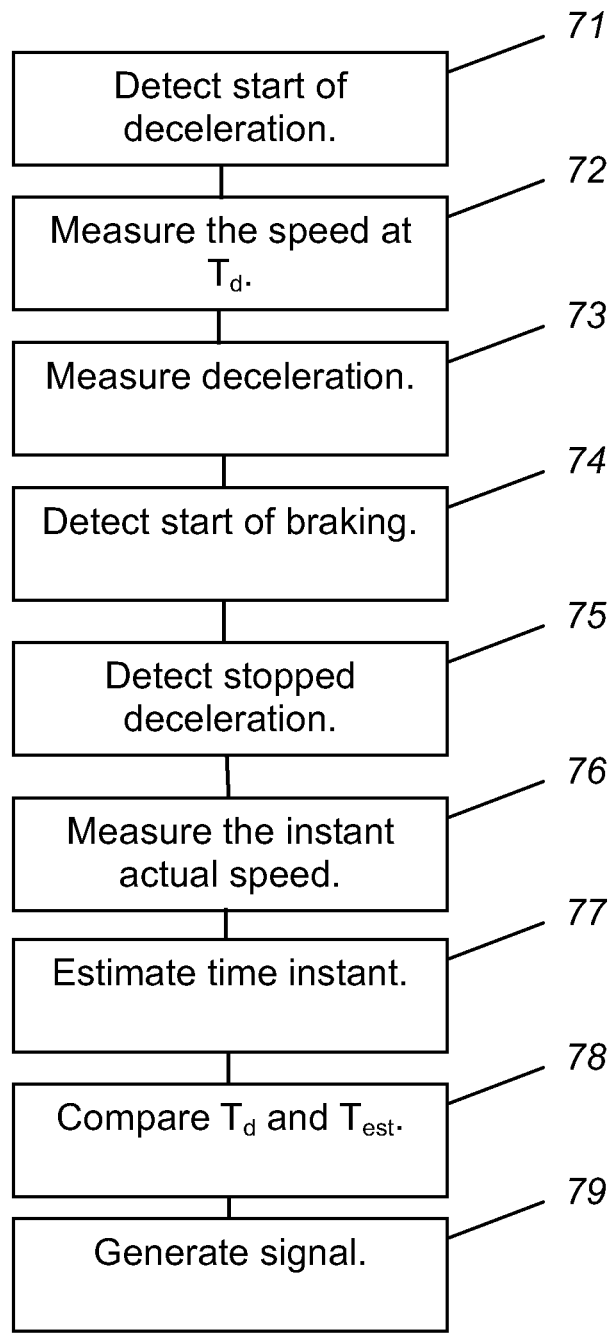
FIG. 7 is a flow chart for an embodiment of a third method.

In the following, a method of an embodiment in accordance with a further aspect which also may be implemented in the apparatus 1 will be described with reference to the diagram in FIG. 6 and the flow chart in FIG. 7. Similar to FIG. 4, the diagram in FIG. 6 illustrates speed curves for the vehicle during a part of a run.

Before the time instant $T_d$ the driver of the vehicle drives at a more or less constant speed. The measurement unit 8 measures the speed of the vehicle during a time interval $I_s$ preceding the time instant $T_d$ at which the driver initiates a deceleration of the vehicle. The speed measured during $I_s$, may be stored in a FIFO storage structure or similar in the memory 4 for later use. The apparatus 1 may thus maintain a speed history for the vehicle.

At $T_d$ the driver starts to decelerate the vehicle by performing a is deceleration action as discussed in connection to the previous aspects. The deceleration continues during the time interval $I_1$ illustrated in FIG. 6. The monitoring unit 16 detects the start of the deceleration (box 71) and in response determines and stores the time of the detection $T_d$ in the memory 4. Moreover, the measurement unit 8 measures the speed $v_{act}(T_d)$ and stores it in the memory 4 (box 72). Then the measurement unit 8 starts measuring the deceleration of the vehicle as has been previously described (box 73).

At time instant $T_b$ the driver starts braking. The monitoring unit 16 detects the initiation of the braking wherein the measurement unit 8 finishes measuring the deceleration (box 74).

At time instant $T_s$ the driver stops decelerating the vehicle (i.e. the driver stops braking the vehicle or the vehicle comes to a full stop). The monitoring unit 16 detects the stopped deceleration (box 75) and determines and stores the time of the detection $T_s$ in the memory 4. In response, the measurement unit 8 measures the instant actual speed of the vehicle at $T_s$, $v_{act}(T_s)$, and stores the measured speed in the memory 4 (box 76)

The estimation unit 10 retrieves the measured speeds and the times stored in the memory 4 by the measurement unit 8 and the monitoring unit 16. The estimation unit 10 uses the retrieved data to estimate a time instant $T_{est}$, before $T_d$, such that a deceleration, corresponding to the deceleration measured by the measurement unit 8 during $I_2$, from $v_{act}(T_d)$, during a time interval from the $T_{est}$ to $T_s$, would result in an estimated speed $v_{est}(T_s)$ at $T_s$, matching $v_{act}(T_s)$ (box 77).

In case the speed was measured at two time instants, the estimation unit 10 may estimate the time instant $T_{est}$ using the following formula:

$$v_{act}(T_s) = v_{act}(T_d) + \frac{v_{act}(T_2) - v_{act}(T_1)}{T_2 - T_1} \cdot (T_s - T_{est})$$

or any equivalent expression. $T_{est}$ thus forms an estimate of the time from which the driver could start a deceleration and reach the speed $v_{act}(T_s)$ if the deceleration during $I_1$ had been maintained until $T_s$. $T_{est}$ calculated using this formula may form a good estimate if the speed of the vehicle during $I_s$ was approximately constant, i.e. if $v_{act}(T_{est})$ approximately matches $v_{act}(T_d)$ and if the deceleration during $I_1$ was approximately linear.

According to an alternative embodiment, the estimation unit 10 estimates a time instant $T_{est}$, before $T_d$, at which a speed $v_{act}(T_{est})$ of the vehicle was such that a deceleration, corresponding to the deceleration measured by the measurement unit 8 during $I_1$, from $v_{act}(T_{est})$, during a time interval from the $T_{est}$ to $T_s$, would result in an estimated speed $v_{est}(T_s)$ at $T_s$, matching $v_{act}(T_s)$. In case the speed was measured at two time instants, the estimation unit 10 may estimate the time instant $T_{est}$ using the following formula:

$$v_{act}(T_s) = v_{act}(T_{est}) + \frac{v_{act}(T_2) - v_{act}(T_1)}{T_2 - T_1} \cdot (T_s - T_{est})$$

$T_{est}$ may be found from this equation e.g. using an iterative technique starting with the assumption $T_{est} = T_d$ and decrementing $T_{est}$ in small steps until the above equation is at least approximately fulfilled. Alternatively, $T_{est}$ may be determined by plotting the curve $v_{est}(t)$ shown in FIG. 6 and determining where it intersects a plot of the actual speed of the vehicle $v_{act}(t)$.

In case the speed was measured at more than two time instants (e.g. $v_{act}(T_1)$, $v_{act}(T_2)$, ... $v_{act}(T_N)$) the estimation unit 10 may determine a trend in the measured deceleration and determine the time instant $T_{est}$ based on the trend. As discussed earlier, the trend may be determined using techniques such as curve fitting or regression analysis. The specific type of technique may be chosen depending on the accuracy needed and the processing resources available.

Optionally, as discussed in relation to the method of the previous aspect, the estimation unit 10 may determine the accuracy of the trend in relation to the measured deceleration and abort the method in case the accuracy is insufficient.

In both of the above embodiments, the estimation unit 10 stores the time estimate $T_{est}$ in the memory 4. The comparison unit 12 retrieves both $T_{est}$ and $T_d$ from the memory 4 and compares them (box 78). The difference between $T_{est}$ and $T_d$ may be interpreted as how long before $T_d$ the driver should have initiated the deceleration in order to reach the intended speed $v_{est}(T_s)$ at $T_s$ without applying the brakes during $I_2$.

The comparison unit 12 stores the result of the comparison in the data memory 4. The result may e.g. simply be a "true" value (e.g. a "1") indicating that $T_{est}$ was smaller than $T_d$. Alternatively, the result may be the actual difference between $T_{est}$ and $T_d$. The signal generator 14 retrieves the result from the memory 4 and generates a signal based on the result (box 79).

As discussed in relation to the other methods, the signal may be any one of a control signal for a display and/or a loudspeaker corresponding to the result of the comparison.

Optionally, the apparatus 1 may comprise a distance unit arranged to estimate a distance traveled by the vehicle during a time interval corresponding to the time difference between $T_{est}$ and $T_d$. This distance estimate may be an estimate of at what position, before the position at $T_d$, the driver should have initiated the deceleration in order to reach the intended speed $v_{est}(T_s)$ at $T_s$ without braking during $I_2$. The distance estimate may be calculated by multiplying the time difference by the actual speed of the vehicle at $T_d$, i.e. $v_{act}(T_d)$.

According to a more elaborate version, the distance estimate may be calculated by integrating the vehicle speed from time instant $T_{est}$ to time instant $T_d$ e.g. based on the speed history during $I_s$ stored in the memory 4.

In any case, the signal generator 14 may generate a signal based on the distance estimate.

In the above, the inventive concept has mainly been described with reference to a few embodiments. However, as is readily appreciated by a person skilled in the art, other embodiments than the ones disclosed above are equally possible within the scope of the inventive concept, as defined by the appended claims.

The invention claimed is:

1. Method for evaluating deceleration of a vehicle comprising:
    measuring a deceleration of the vehicle during a first time interval,
    determining a trend in the measured deceleration,
    estimating calculating a speed of the vehicle at a first time instant in a second time interval,
    which is different from the first time interval, based on the measured deceleration by extrapolating the trend to said first time instant, wherein the calculated speed forms an estimate of a speed the vehicle would reach had the determined trend had been maintained until said first time instant,
    measuring a speed of the vehicle at said first time instant,
    comparing the calculated speed to the measured speed,
    generating a signal based on said comparison, and
    generating a notification regarding the deceleration based on the signal.

2. Method as claimed in claim 1, further comprising measuring the deceleration in response to detecting that the vehicle is coasting.

3. Method as claimed in claim 1, further comprising finishing measuring the deceleration in response to detecting braking of the vehicle.

4. Method as claimed in claim 1, further comprising measuring the deceleration in response to detecting that the vehicle is engine braking.

5. Method as claimed in claim 4, further comprising finishing measuring the deceleration in response to detecting additional braking, other than engine braking, of the vehicle.

6. Method as claimed in claim 1, further comprising measuring said speed when the deceleration of the vehicle is finished.

7. method as claimed in claim 1, further comprising generating the signal only if the trend deviates from the measured deceleration by less than a threshold value.

8. Method as claimed in claim 1, wherein the comparison comprises comparing the estimated speed squared to the measured speed squared.

9. Apparatus for evaluating deceleration of a vehicle comprising: a measurement unit arranged to measure a deceleration of the vehicle during a first time interval, and measure a speed of the vehicle at a first time instant in a second time interval, which is different from the first time interval,
    an estimation unit arranged to estimate a speed at said first time instant, based on the measured deceleration, wherein the estimation unit is arranged to determine a trend in the measured deceleration, and estimate the speed at said first time instant by extrapolating the trend to said first time instant, wherein the estimated speed forms an estimate of a speed the vehicle would reach had the determined trend had been maintained until said first time instant,
    a comparison unit arranged to compare the estimated speed to the measured speed, and
    a signal generator arranged to generate a signal based on said comparison.

10. Apparatus as claimed in claim 9, wherein the measurement unit is arranged to measure the deceleration in response to detection of coasting of the vehicle.

11. Apparatus as claimed in claim 9, wherein the measurement unit is arranged to finish measuring the deceleration in response to detection braking of the vehicle.

12. Apparatus as claimed in claim 9, wherein the measurement unit is arranged to measure the deceleration in response to detection of engine braking of the vehicle.

13. Apparatus as claimed in claim 12, wherein the measurement unit is arranged to finish measuring the deceleration in response to detection additional braking, other than engine braking, of the vehicle.

14. Apparatus as claimed in claim 9, wherein the measurement unit is arranged to measure said speed when the deceleration of the vehicle is finished.

15. Apparatus as claimed in claim 9, wherein the signal generator is arranged to generate the signal only if the trend deviates from the measured deceleration by less than a threshold value.

16. Apparatus as claimed in claim 9, wherein the comparison unit is arranged compare the estimated speed squared to the measured speed squared.

17. Method for evaluating deceleration of a vehicle comprising:
    measuring a deceleration of the vehicle in a first time interval,
    measuring a speed of the vehicle at a first time instant in a second time interval, which is different from the first time interval,
    determining a trend in the measured deceleration,
    estimating calculating a second time instant at which an estimated speed of the vehicle based on the measured deceleration matches said measured speed by extrapolating the trend to the measured speed, wherein the second time instant forms an estimate of a time instant at which the vehicle would reach said measured speed had the determined trend had been maintained during the second time interval,
    comparing the first time instant and the second time instant,
    generating a signal based on said comparison, and
    generating a notification regarding the deceleration based on the signal.

18. Method as claimed in claim 17, further comprising determining a distance traveled by the vehicle during a time interval corresponding to the difference between the first and the second instant and preceding the first time interval and generating a signal based on the determined distance.

19. Apparatus for evaluating deceleration of a vehicle comprising:
- a measurement unit arranged to measure a deceleration of the vehicle in a first time interval, and measure a speed of the vehicle at a first time instant in a second time interval, which is different from the first time interval,
- an estimation unit arranged to estimate a second time instant at which an estimated speed of the vehicle based on the measured deceleration matches said measured speed, wherein the estimation unit is arranged to determine a trend in the measured deceleration, and estimate the second time instant by extrapolating the trend to the measured speed, wherein the second time instant forms an estimate of a time instant at which the vehicle would reach said measured speed had the determined trend had been maintained during the second time interval,
- a comparison unit arranged to compare the first and the second time instant, and
- a signal generator arranged to generate a signal based on said comparison.

20. Apparatus as claimed in claim 19, further comprising a distance unit arranged to determine a distance traveled by the vehicle during a time interval corresponding to the difference between the first and the second time instant and preceding the first time interval, wherein the signal generator is arranged to generate a signal based on the determined distance.

21. Method for evaluating deceleration of a vehicle comprising:
- determining a time instant of initiation of a deceleration of the vehicle,
- measuring the deceleration of the vehicle during a first time interval,
- measuring a first speed of the vehicle at a first time instant in a second time interval, which is different from the first time interval,
- estimating a second time instant such that a deceleration, corresponding to said measured deceleration, from a second speed of the vehicle prior to the first time interval, during a time interval from the second to the first time instant, results in said first measured speed, comparing the second time instant and the time instant of initiation of the deceleration, and generating a signal based on said comparison, and
- generating a notification regarding the deceleration based on the signal.

22. Method as claimed in claim 21, further comprising measuring the speed of the vehicle at the time instant of initiation of the deceleration and determining the second speed of the vehicle as the speed of the vehicle at the time instant of initiation of the deceleration.

23. Method as claimed in claim 21, further comprising measuring the speed of the vehicle during a third time interval prior to the time instant of initiation of the deceleration and determining the second speed of the vehicle as a speed of the vehicle measured during the third time interval.

24. Method as claimed in claim 21, further comprising determining a distance traveled by the vehicle during a time interval corresponding to the difference between the second time instant and the time instant of initiation of the deceleration and generating a signal based on the determined distance.

25. Apparatus for evaluating deceleration of a vehicle comprising: a monitoring unit arranged to determine a time instant of initiation of a deceleration of the vehicle, a measurement unit arranged to measure the deceleration of the vehicle in a first time interval, and a first speed of the vehicle at a first time instant in a second time interval, which is different from the first time interval, an estimation unit arranged to estimate a second time instant such that a deceleration, corresponding to said measured deceleration, from a second speed of the vehicle prior to the first time interval, during a time interval from the second to the first time instant, results in said first measured speed, a comparison unit arranged to compare the second time instant and the time instant of initiation of the deceleration, and generating a signal based on said comparison.

26. Apparatus as claimed in claim 25, wherein the measurement unit is further arranged to measure the speed of the vehicle at the time instant of initiation of the deceleration, wherein the second speed of the vehicle is determined as the speed of the vehicle at the time instant of initiation of the deceleration.

27. Apparatus as claimed in claim 25, wherein the measurement unit is further arranged to measure the speed of the vehicle during a third time interval prior to the time instant of initiation of the deceleration wherein the second speed of the vehicle is determined as a speed of the vehicle measured during the third time interval.

28. Apparatus as claimed in claim 25, further comprising a distance unit arranged to determine a distance traveled by the vehicle during a time interval corresponding to the difference between the second time instant and the time instant of initiation of the deceleration, wherein the signal generator is arranged to generate a signal based on the determined distance.

* * * * *